(12) United States Patent
Germain et al.

(10) Patent No.: US 7,559,715 B2
(45) Date of Patent: Jul. 14, 2009

(54) HURRICANE PANEL FASTENING DEVICE

(75) Inventors: Craig D. Germain, Bluffton, SC (US); Reid P. Germain, Bluffton, SC (US)

(73) Assignee: Campus Housing Company LLC, Bluffton, SC (US)

( * ) Notice: Subject to any disclaimer, the term of this patent is extended or adjusted under 35 U.S.C. 154(b) by 0 days.

(21) Appl. No.: 11/987,261

(22) Filed: Nov. 28, 2007

(65) Prior Publication Data

US 2009/0136292 A1  May 28, 2009

(51) Int. Cl.
*E06B 5/00* (2006.01)
(52) U.S. Cl. .............................. 403/294; 49/57; 49/463; 52/202
(58) Field of Classification Search .................. 403/167, 403/294, 318, 319, 362, 378, 379.1, 379.4, 403/379.5; 49/57, 463; 52/202, 203
See application file for complete search history.

(56) References Cited

U.S. PATENT DOCUMENTS

| | | | | | |
|---|---|---|---|---|---|
| 2,622,285 | A | * | 12/1952 | Roos | 52/202 |
| 3,552,775 | A | * | 1/1971 | Warner | 280/492 |
| 4,562,666 | A | * | 1/1986 | Young, III | 49/62 |
| 5,320,439 | A | * | 6/1994 | Perrault et al. | 403/379.1 |
| 5,335,452 | A | * | 8/1994 | Taylor | 49/463 |
| 5,347,775 | A | * | 9/1994 | Santos | 52/202 |
| 5,562,360 | A | * | 10/1996 | Huang | 403/379.1 |
| 5,722,206 | A | * | 3/1998 | McDonald | 52/202 |
| 6,202,282 | B1 | * | 3/2001 | Holdsworth | 29/456 |
| 6,393,777 | B1 | * | 5/2002 | Renfrow | 52/202 |
| 6,532,702 | B1 | * | 3/2003 | Scribner | 52/202 |
| 6,745,522 | B2 | * | 6/2004 | Germain | 52/202 |
| 7,062,884 | B2 | * | 6/2006 | Jaycox et al. | 52/203 |
| 2007/0107328 | A1 | * | 5/2007 | Munch | 52/202 |
| 2008/0196333 | A1 | * | 8/2008 | Tyler | 52/204.63 |

* cited by examiner

*Primary Examiner*—Daniel P Stodola
*Assistant Examiner*—Joshua T Kennedy
(74) *Attorney, Agent, or Firm*—Oliff & Berridge, PLC

(57) ABSTRACT

A fastener for removably securing a protective panel to a structure includes a shaft having a first portion and a second portion. The shaft includes a first opening extending through the second portion of the shaft. The fastener also includes a sleeve sized to fit over the second portion of the shaft. The sleeve includes second and third openings extending through the sleeve that are spaced apart by a distance greater than a thickness of the protective panel to be secured to the structure. The second opening corresponds to the first opening in the shaft and the third opening is located in the sleeve beyond an end of the second portion of the shaft when the first and second openings are aligned. The fastener also includes a first pin that is insertable into the first and second openings and a second pin that is insertable into the third opening.

5 Claims, 4 Drawing Sheets

HURRICANE PANEL FASTENING DEVICE

BACKGROUND

The use of wood, plastic or metal to protect a window during a storm is well known in the prior art. Typically, during a storm, the protective panel is placed over a window or door of a structure and attached by using nails or screws. However, the use of nails or screws often prevents the panels from being removed from the structure in a quick and easy manner.

To overcome this problem, several solutions have been developed. Specifically, U.S. Pat. No. 6,532,702 to Scribner discloses a building fixture protection apparatus having protective panels and means to quickly connect and disconnect the protective panels from outside the building, such as windows and doors. U.S. Pat. No. 7,062,884 to Jaycox et al. discloses a locking assembly for retaining a pair of shutters in a closed position during inclement weather that allows for quick locking and unlocking of the pair of shutters from inside the building.

SUMMARY

In a case where the connection means such as that of Scribner is used to secure a protective panel to protect the window of the structure, an individual who is inside the structure cannot exit the structure as the connection means only allows for removal of the panels from outside the building. In a case where the locking assembly of Jaycox et al. is used to secure shutters in a closed position, an individual such as a fireman who wishes to enter the building in order to secure the safety of the individuals inside the building is prevented from doing so as the locking assembly only allows for removal of the apir of shutters from within a building.

This invention provides a fastener for securing a protective panel to a structure that allows the protective panel to be removed from both the inside and the outside of the structure.

In accordance with a preferred embodiment, a fastener for removably securing a protective panel to a structure comprises a shaft having a first portion to be frictionally inserted into the structure and a second portion protruding from the structure. The shaft includes a first opening extending through the second portion of the shaft. The fastener also comprises a sleeve sized to fit over the second portion of the shaft. The sleeve includes second and third openings extending through the sleeve that are spaced apart by a distance greater than a thickness of the protective panel to be secured to the structure. The second opening corresponds to the first opening in the shaft and the third opening is located in the sleeve beyond an end of the second portion of the shaft when the first and second openings are aligned. The fastener also comprises a first pin that is insertable into the first and second openings and a second pin that is insertable into the third opening to position the protective panel between the first and second pins.

In accordance with another preferred embodiment, a method for removably securing a protective panel to a structure comprises frictionally inserting the first portion of the shaft into the structure with the second portion of the shaft protruding from the structure, locating the sleeve over the second portion of the shaft, and aligning the first and second openings. Further, the protective panel is mounted on the sleeve between the aligned first and second openings and the third opening. The first pin is inserted into the first and second openings on an interior side of the panel and the second pin is inserted into the third opening on an exterior side of the panel.

BRIEF DESCRIPTION OF THE DRAWINGS

The invention will be described with reference to the accompanying drawings, in which like elements are labeled with like numbers and in which.

DETAILED DESCRIPTION OF EMBODIMENTS

Figure 1:
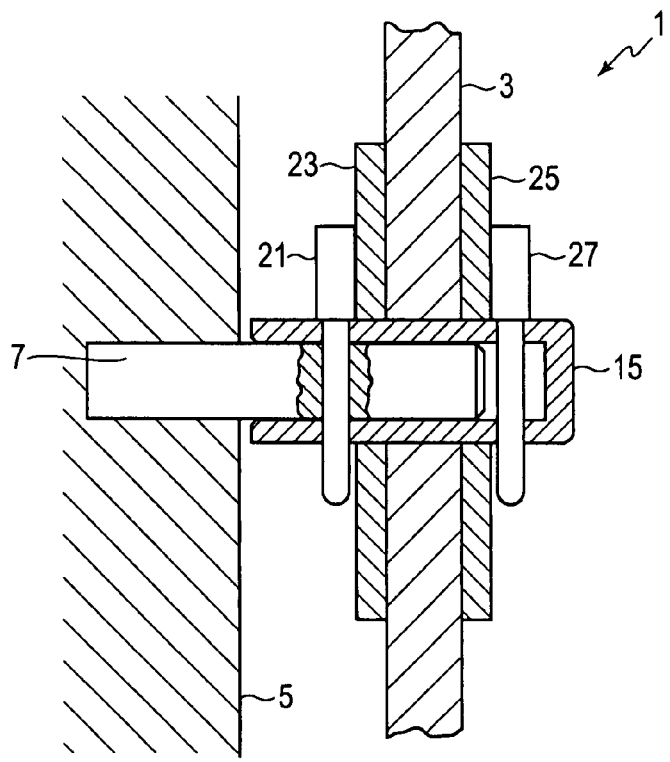
FIG. 1 is a cross-sectional view of the fastener.

FIG. 1 shows an exemplary embodiment of a fastener 1 for removably securing a protective panel 3 to a structure 5. The protective panel 3 may be comprised of wood, plastic or metal, and is positioned over a window of a structure 5, thereby protecting a window during a storm. One example of a protective panel that may be secured to a structure using the fastener 1 is that disclosed in U.S. Pat. No. 6,745,522.

The fastener of the exemplary embodiment includes a shaft 7. The shaft 7 includes a first portion 9 and a second portion 11 having a first opening 13 extending therethrough. The first portion 9 of the shaft 7 is frictionally inserted into the structure 5 such that the first portion is fixed to the structure 5, and the second portion of the shaft 7 protrudes from the structure 5. The first portion 9 may be frictionally inserted into the structure 5 by any known means, i.e., bolts, nails, or glue.

Figure 2:
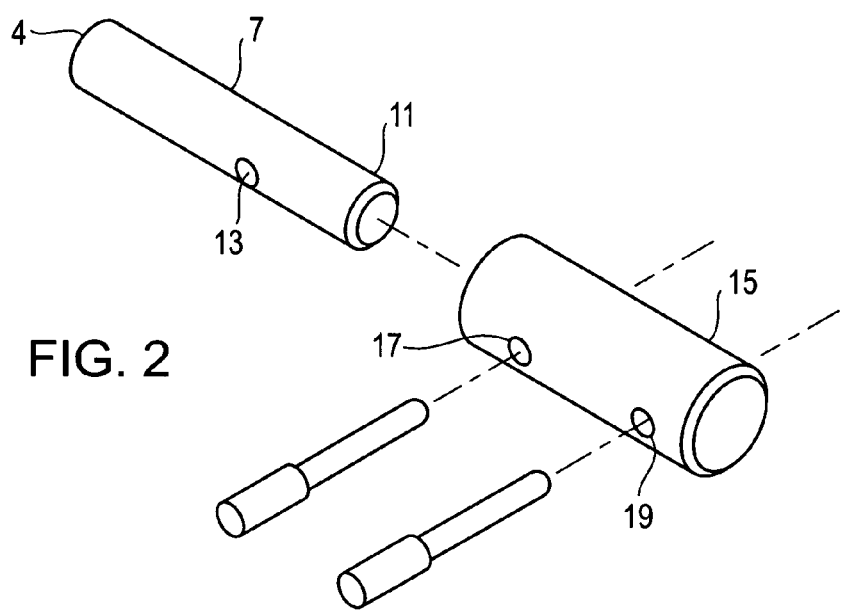
FIG. 2 is an exploded view of the fastener.
Figure 4:
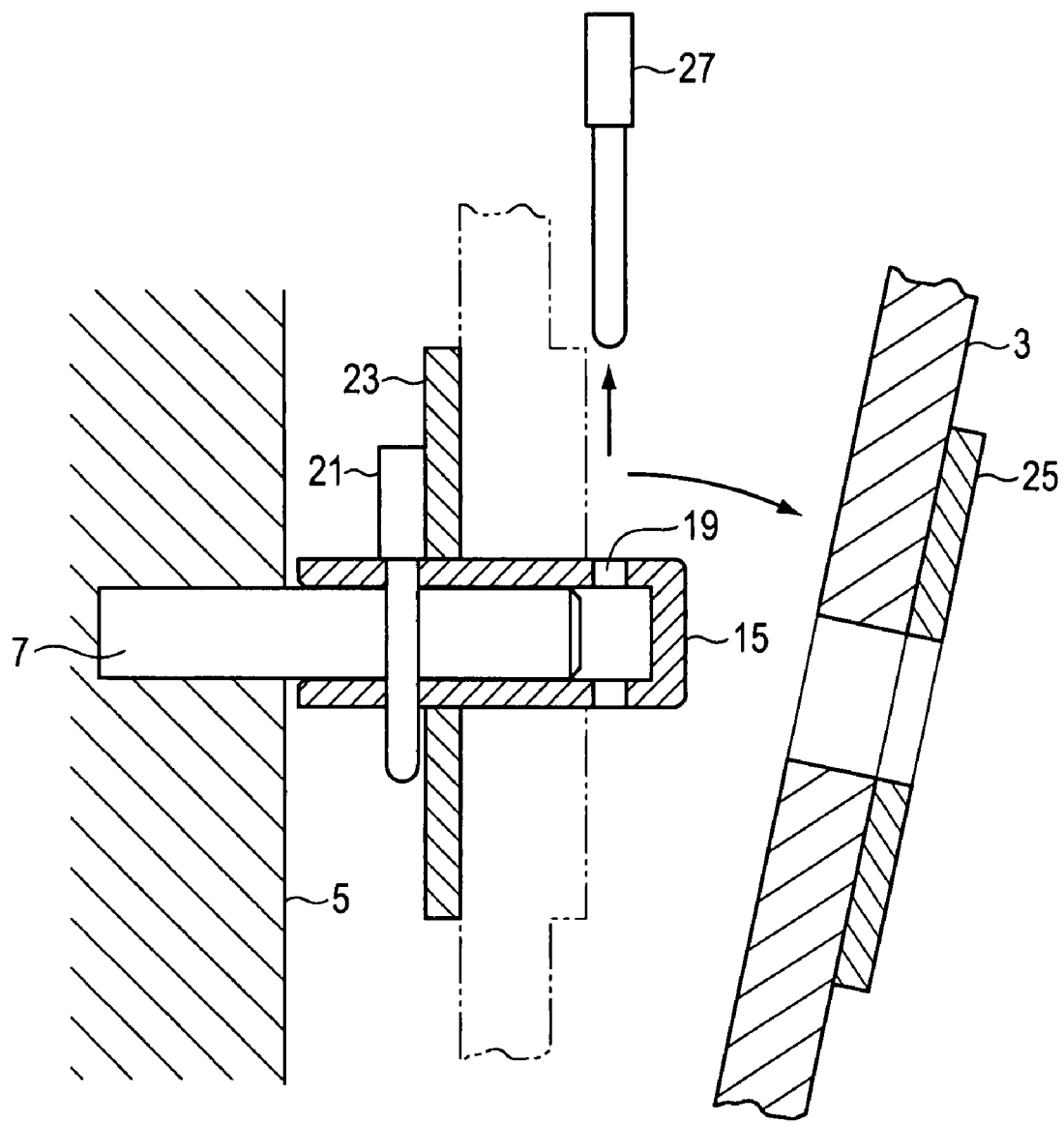
FIG. 4 is a cross-sectional view of the fastener illustrating the removal of the panel from outside the structure.

As shown in FIGS. 1, 2 and 4, the shaft 7 is configured such that a sleeve 15 may be slid over the second portion of the shaft 7. Specifically, as shown in FIG. 2, the shaft 7 may have a cylindrical cross section. However, the shaft 7 may also have a rectangular cross section.

The sleeve 15 includes a second opening 17 and a third opening 19 that extend through the sleeve 15. The second opening 17 and the third opening 19 are spaced apart by a distance greater than a thickness of the protective panel 3. The sleeve 15 is slid over the shaft 7 so that the second opening 17 is aligned with the first opening 13 of the shaft 7. Because the second opening 17 and the third opening 19 are spaced apart by a distance greater than a thickness of the protective panel 3, the third opening 19 is located beyond an end of the second portion 11 of the shaft 7 when the first opening 13 and the second opening 17 are aligned, as illustrated in FIGS. 1 and 4.

FIGS. 1 and 4 show a first removable pin 21 that may be used to lock the shaft 7 and the sleeve 15 to each other. The first removable pin 21 is inserted into the aligned first opening 11 and second opening 17, thereby preventing the shaft 7 and the sleeve 13 from disengaging from each other. The first removable pin 21 may include a thin cylindrical rod made of metal, or a cotter pin. Further, as shown in FIGS. 1 and 4, the fastener may include a first plate 23 that includes a hole in the center thereof, for example a circular washer. The hole of the first plate 23 is sized to fit over the sleeve 15. The first plate 23 is slid over the sleeve 15 such that it abuts the first removable pin 21. A protective panel 3 can then be positioned to abut against the first plate 23. The protective panel 3 can be secured in place by a second plate 25 that includes a hole in a center thereof, sized to fit over the sleeve 15. The second plate 25 is slid over the sleeve until it abuts against the protective panel 3. Once the second plate 25 is in place, a second removable pin 27 is inserted into the third opening of the sleeve 13. The second removable pin 27 is positioned such that it is in contact with the second plate 25. The second removable pin 27 thus ensures that the protective panel 3 is fixed in place. Similar to the first removable pin 21, the second removable pin 27 may include a thin cylindrical rod made of metal, or a cotter pin.

Once constructed, the exemplary fastener 1 and protective panel 3 shown in FIG. 1 provide protection to a window during a storm. The exemplary fastener 1 also allows a person to remove the protective panel 3 from either the inside or the outside of the structure. For example, as shown in the exemplary embodiment of FIG. 5, once the fastener 1 is constructed to secure the protective panel 3, there exists a sufficient amount of space between a face of the structure 5 and the protective panel 3. This space allows a person who is inside the building to remove the protective panel 3.

Figure 3:
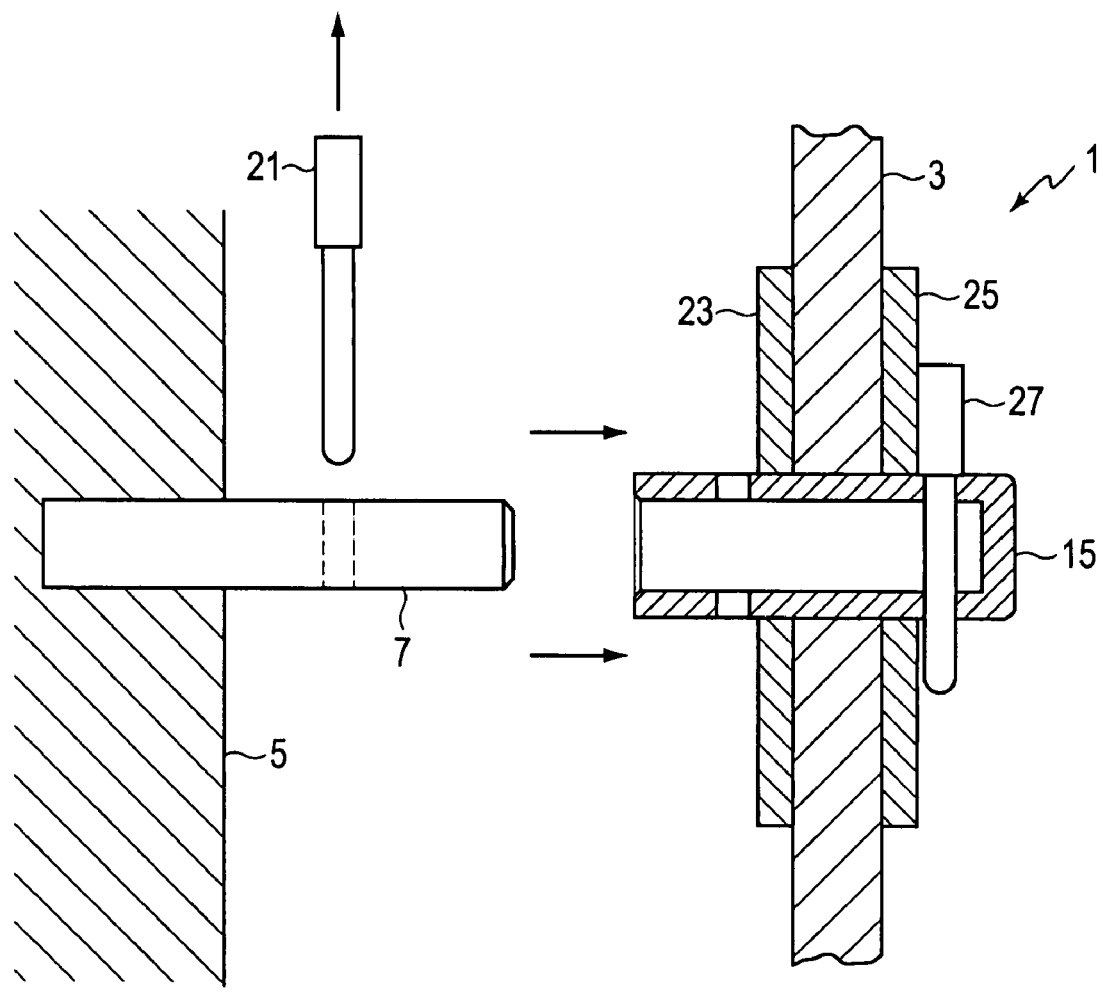
FIG. 3 is a cross-sectional view of the fastener illustrating the removal of the panel from inside the structure.

FIG. 3 shows a method of disconnecting the protective panel 1 from inside of the structure 5. For example, FIG. 3 shows the first removable pin 21 being removed from the first opening 13 and the second opening 17. As shown in FIG. 3, once the first removable pin 21 is removed from the first opening 13 and the second opening 17, the sleeve 15, which includes the first plate 23, the second plate 25, and the second removable pin 27 securing the protective panel 3, may be slid off of the shaft 7. As a result, the protective panel 3 is no longer fixed over the window, and the person inside the structure can easily exit the structure.

FIG. 4 shows a method of disconnecting the protective panel 3 from outside of the structure 5. For example, FIG. 4 shows the second removable pin 27 being removed from the third opening 19 of the sleeve 15. Once the second removable pin 27 is removed from the third opening 19, the protective panel 3 is released from the fastener 1.

Figure 5:
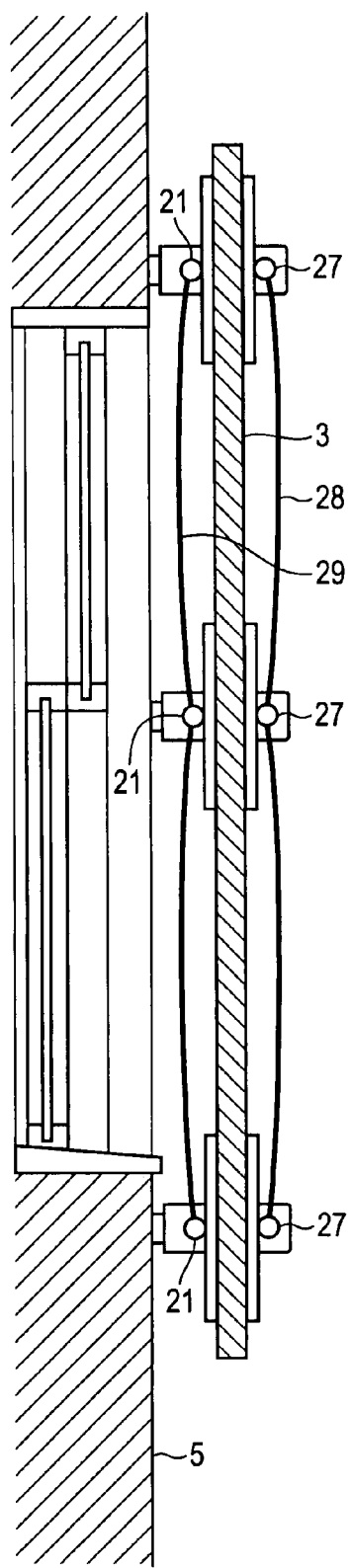
FIG. 5 is a cross-sectional view of several fasteners for securing the panel to the structure with a first harness connected to the interior pins and a second harness connected to the exterior pins.

FIG. 5 shows another exemplary embodiment in which a first harness 29 is attached to first removable pins 21 of respective fasteners, and a second harness 28 that is attached to second removable pins 27 of respective fasteners. The first harness 29 and second harness 28 provide a quick and easy method of removing multiple first removable pins 21 and second removable pins 27 from respective fasteners. For example, pulling an end of the first harness 29 causes the first removable pins 21 to be removed from the respective fasteners in one motion, thereby allowing a person that is inside of the structure to release the protective panel in a quick and easy manner. On the other hand, the second harness 28 allows a person that is on the outside of the structure to remove the second removable pins 27 from the respective fasteners in a quick and easy manner by pulling on an end of the second harness. The first harness 29 may be attached to all of the first removable pins 21 of respective fasteners, or may be attached to only some of the first removable pins 21 of respective fasteners. Likewise, the second harness 28 may be attached to all of the second removable pins 27 of respective fasteners, or may be attached to only some of the second removable pins 27 of respective fasteners. By attaching the first harness 29 and the second harness 28 to less than all of the removable pins, the removable pins that are not attached the first harness 29 and second harness 28 can be pulled out individually.

While this invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A panel fastening device including a protective panel and a fastener capable of removably securing the protective panel to a structure, comprising:
   a shaft having a first portion capable of being frictionally inserted into a bore of the structure, and a second portion capable of protruding from the structure, the shaft having a first opening extending through the second portion of the shaft;
   a sleeve sized to fit over the second portion of the shaft and having second and third openings extending through the sleeve and being spaced apart by a distance greater than a thickness of the protective panel to be secured to the structure, the second opening corresponding to the first opening in the shaft and the third opening being located in the sleeve beyond an end of the second portion of the shaft when the first and second openings are aligned and wherein the protective panel is mounted on the sleeve between the aligned first and second openings and the third opening; and
   a first pin inserted into the first and second openings and a second pin inserted into the third opening to operatively engage and secure the protective panel between the first and second pins.

2. The panel fastening device of claim 1, wherein a plate is located in at least one of two positions: (1) between the first pin and the protective panel; and (2) between the second pin and the protective panel.

3. The panel fastening device of claim 1, wherein when the first pin is removed from the first and second openings, the sleeve and protective panel are released from the shaft.

4. The panel fastening device of claim 1, wherein when the second pin is removed from the third opening, the protective panel is released from the sleeve.

5. The panel fastening device of claim 1, further comprising a harness attached to at least one of the first and second pins for removing the one of the first and second pins by pulling on the harness.

* * * * *